(12) United States Patent
Cahill

(10) Patent No.: US 10,472,054 B2
(45) Date of Patent: Nov. 12, 2019

(54) ANTISKID OPERATION DURING DEGRADED OPERATION

(71) Applicant: Goodrich Corporation, Chartlotte, NC (US)

(72) Inventor: Eric Daniel Cahill, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 312 days.

(21) Appl. No.: 15/438,051

(22) Filed: Feb. 21, 2017

(65) Prior Publication Data

US 2018/0237131 A1  Aug. 23, 2018

(51) Int. Cl.
| | |
|---|---|
| B64C 25/42 | (2006.01) |
| B64C 25/34 | (2006.01) |
| B60T 8/17 | (2006.01) |
| B60T 8/172 | (2006.01) |
| B60T 8/1761 | (2006.01) |
| B60T 8/1763 | (2006.01) |
| B60T 8/96 | (2006.01) |

(52) U.S. Cl.
CPC ............ *B64C 25/42* (2013.01); *B60T 8/172* (2013.01); *B60T 8/1703* (2013.01); *B60T 8/1761* (2013.01); *B60T 8/1763* (2013.01); *B60T 8/96* (2013.01); *B64C 25/34* (2013.01); *B60T 2270/416* (2013.01)

(58) Field of Classification Search
CPC ......... B64C 25/42; B64C 25/34; B60T 8/885; B60T 8/96; B60T 8/1763; B60T 8/1761; B60T 8/1703; B60T 8/172; B60T 2270/416
USPC .......................................................... 701/80
See application file for complete search history.

(56) References Cited

U.S. PATENT DOCUMENTS

| | | | | |
|---|---|---|---|---|
| 4,774,667 A | * | 9/1988 | Kuraoka ............. | B60T 8/17616 303/174 |
| 6,225,894 B1 | * | 5/2001 | Kyrtsos .................... | B60Q 1/52 180/282 |
| 8,029,074 B2 | | 10/2011 | Cahill | |

(Continued)

FOREIGN PATENT DOCUMENTS

| | | |
|---|---|---|
| DE | 102006010097 | 9/2007 |
| EP | 2450247 | 5/2012 |

(Continued)

OTHER PUBLICATIONS

European Patent Office, European Search Report dated Jul. 6, 2018 in Application No. 18157822.0-1012.

*Primary Examiner* — Muhammad Shafi
(74) *Attorney, Agent, or Firm* — Snell & Wilmer, L.L.P.

(57) ABSTRACT

A braking system may include a controller, a first wheel and a second wheel. The first wheel may be laterally displaced from the second wheel by a first distance. A first wheel speed sensor may be coupled to the first wheel and a second wheel sensor may be coupled to the second wheel. The controller may be configured to determine at least one of a slip ratio, a coefficient of friction, or a braking pressure of the second wheel in response to failure of the first wheel speed sensor. The controller may be configured to calculate a consistency value of the at least one of the slip ratio, the coefficient of friction, or the braking pressure. The controller may be configured to adjust a braking pressure of the first wheel speed sensor based upon the consistency value and the first distance.

9 Claims, 11 Drawing Sheets

(56) References Cited

U.S. PATENT DOCUMENTS

| | | | |
|---|---|---|---|
| 8,590,985 B2 | 11/2013 | Cahill | |
| 9,056,673 B2 | 6/2015 | Raby et al. | |
| 2005/0040286 A1 | 2/2005 | Radford | |
| 2009/0276133 A1 | 11/2009 | May | |
| 2011/0066949 A1* | 3/2011 | DeLuca | G06Q 10/10 715/744 |
| 2015/0012201 A1* | 1/2015 | Metzger | B60T 8/1703 701/82 |
| 2015/0366527 A1* | 12/2015 | Yu | A61B 5/055 382/131 |

FOREIGN PATENT DOCUMENTS

| | | |
|---|---|---|
| GB | 2463752 | 3/2010 |
| WO | 0142070 | 6/2001 |

\* cited by examiner

ANTISKID OPERATION DURING DEGRADED OPERATION

FIELD

The present disclosure relates to braking systems, and, more specifically, to brake control systems.

BACKGROUND

Aircraft often include one or more landing gear that comprise one or more wheels. Each wheel may have a brake, which is part of an aircraft braking system, that is operatively coupled to the wheel to slow the wheel, and hence the aircraft, during, for example, landing or a rejected takeoff. Aircraft braking systems may utilize wheel speed data received from a wheel speed sensor to control braking. From time to time, a wheel speed sensor could cause an aircraft braking system to be deprived of such wheel speed data for the wheel experiencing the wheel speed sensor failure.

SUMMARY

Systems and methods disclosed herein may be useful for controlling the braking of a wheel that is experiencing wheel speed sensor failure. A braking system is provided. A braking system may comprise a controller, a first wheel and a second wheel. The first wheel may be laterally displaced from the second wheel by a first distance. A first wheel speed sensor may be coupled to the first wheel and a second wheel sensor may be coupled to the second wheel. The controller may be configured to determine at least one of a slip ratio, a coefficient of friction, or a braking pressure of the second wheel in response to failure of the first wheel speed sensor. The controller may be configured to calculate a consistency value of the at least one of the slip ratio, the coefficient of friction, or the braking pressure. The controller may be configured to adjust a braking pressure of the first wheel speed sensor based upon the consistency value and the first distance.

In various embodiments, the controller may be configured to adjust the braking pressure applied to the first wheel as a proportion of a braking pressure applied to the second wheel. The first wheel may be separated from the second wheel by a second distance. The second distance may represent that the first wheel is at least one of forward or aft of the second wheel. The first wheel may be disposed on a different landing gear than the second wheel. The controller may be configured to determine at least one of a slip ratio, a coefficient of friction, or a braking pressure of a third wheel. The third wheel may be laterally displaced from the first wheel. The consistency value may comprise a standard deviation. The consistency value may be determined using a weighting factor with the at least one of the slip ratio, the coefficient of friction, or the braking pressure associated with the third wheel.

A braking system may comprise a controller, a first wheel and a second wheel. The first wheel may be displaced from the second wheel in at least one of a forward direction or an aft direction by a second distance. A first wheel speed sensor may be coupled to the first wheel and a second wheel sensor may be coupled to the second wheel. The controller may be configured to determine at least one of a slip ratio, a coefficient of friction, or a braking pressure of the second wheel in response to failure of the first wheel speed sensor. The controller may be configured to calculate a consistency value of the at least one of the slip ratio, the coefficient of friction, or the braking pressure. The controller may be configured to adjust a braking pressure applied to the first wheel based upon the consistency value and the second distance.

In various embodiments, the controller may be configured to adjust the braking pressure applied to the first wheel as a proportion of a braking pressure applied to the second wheel. The first wheel may be disposed on a different landing gear than the second wheel. The controller may be configured to determine at least one of a slip ratio, a coefficient of friction, or a braking pressure of a third wheel. The third wheel may be laterally displaced from the first wheel. The consistency value may comprise a standard deviation. The consistency value may be determined using a weighting factor with the at least one of the slip ratio, the coefficient of friction, or the braking pressure associated with the third wheel.

A method is also provided. The method may comprise the step of determining, by a controller, at least one of a slip ratio, a coefficient of friction, or a braking pressure of the second wheel in response to failure of the first wheel speed sensor coupled to a first wheel. The first wheel may be laterally displaced from the second wheel by a first distance. The method may comprise the steps of calculating, by the controller, a consistency value of the at least one of the slip ratio, the coefficient of friction, or the braking pressure associated with the second wheel, and adjusting, by the controller, a braking pressure applied to the first wheel based upon the consistency value and the first distance.

In various embodiments, the step of adjusting may comprise adjusting, by the controller, braking pressure applied to the first wheel as a proportion of a braking pressure applied to the second wheel. The method may further comprise the step of adjusting, by the controller, braking pressure applied to the first wheel based upon a second distance. The second distance may separate the second wheel from the first wheel in at least one of the forward or aft direction. The method may further comprise the step of determining, by the controller, at least one of a slip ratio, a coefficient of friction, or a braking pressure of a third wheel. The third wheel may be laterally displaced from the first wheel. The method may further comprise the step of mapping, by the controller, the consistency value to a preliminary amount of braking pressure. The step of calculating may further comprise calculating, by the controller, a standard deviation to produce the consistency value. The method may further comprise the step of weighting, by the controller, the at least one of the slip ratio, the coefficient of friction, or the braking pressure associated with the third wheel in the calculating the consistency value.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

Figure 1:
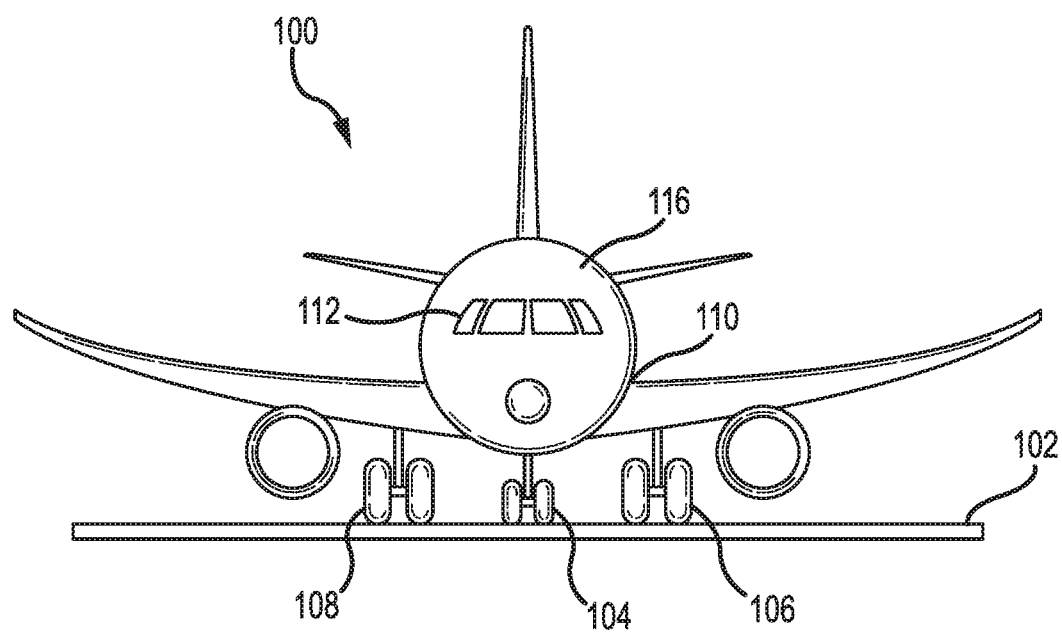
- FIG. 1 illustrates an aircraft in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft. As used herein, "forward" refers to the direction associated with the nose (e.g., the front end) of an aircraft, or generally, to the direction of flight or motion.

Systems and methods disclosed herein may be useful for controlling the braking of a wheel that is experiencing wheel speed sensor failure. Although the embodiments herein are described with reference to braking systems used in connection with aircraft, such embodiments are provided for example only as it is contemplated that the disclosures herein have applicability to other vehicles, such as automobiles and/or vehicles with brakes.

Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, antiskid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected. A brake controller may be configured to control the SOV and BSV, among other aspects of aircraft braking.

In electronic brakes, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

A controller as disclosed herein may include one or more processor. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

With reference to FIG. 1, aircraft 100 on runway 102 is shown. Aircraft 100 may comprise right landing gear 108 and left landing gear 106. Nose landing gear 104 is located under the nose of aircraft 100 and may not include a brake. Aircraft 100 may comprise a controller 110 and pilot controls 112. Aircraft 100 may include a plurality of sensors that detect aircraft status information, such as an avionics unit or aircraft data source 116. Aircraft status information may mean any information relating to the status of an aircraft, for example, the presence of weight on wheels, aircraft velocity, aircraft acceleration, wheel position, wheel velocity, wheel acceleration, air temperature, the pressure applied to the brake stack during braking, global positioning system coordinates, aircraft location, aircraft position on a runway, or other aircraft data. An aircraft brake system may have access to various aircraft status information at any given time.

Figure 2A:
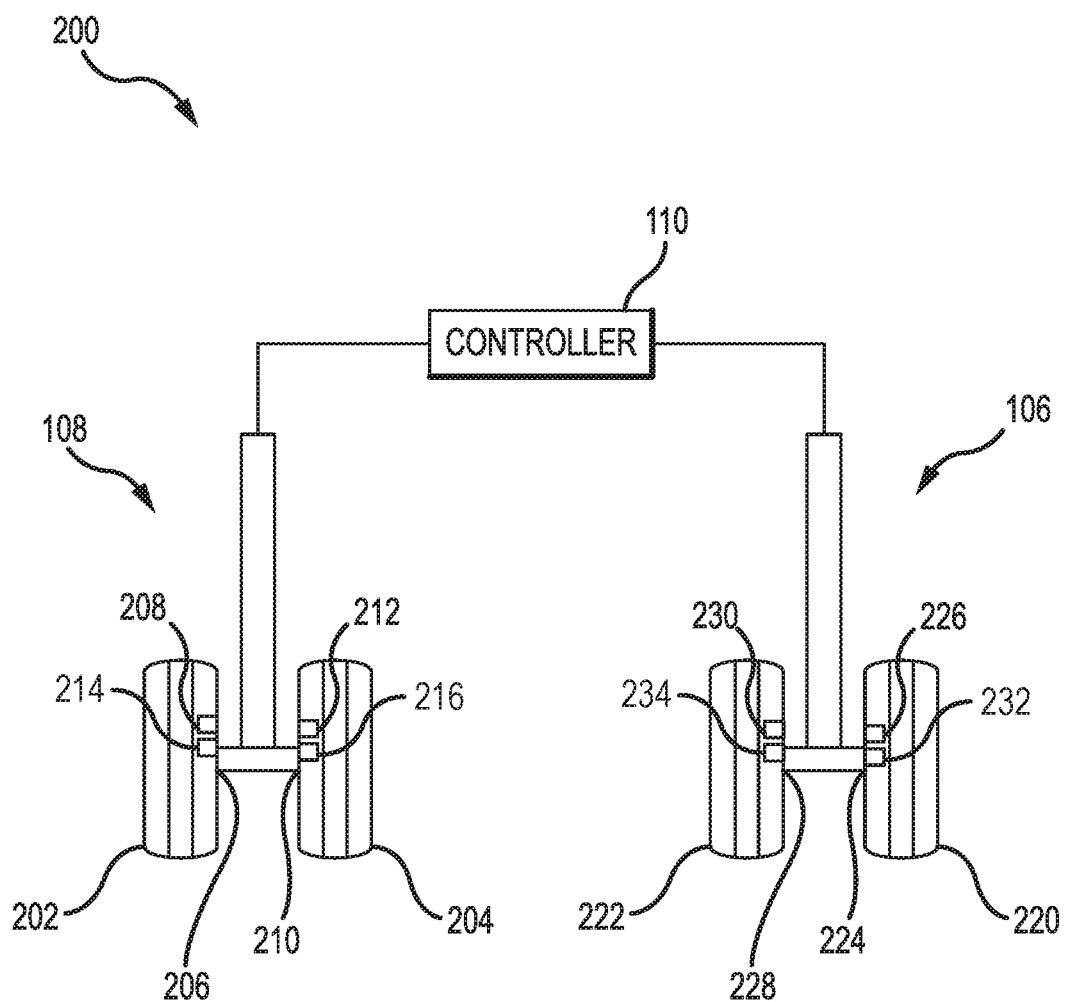
FIG. 2A illustrates a landing gear of the aircraft shown in FIG. 1, in accordance with various embodiments.
Figure 4:
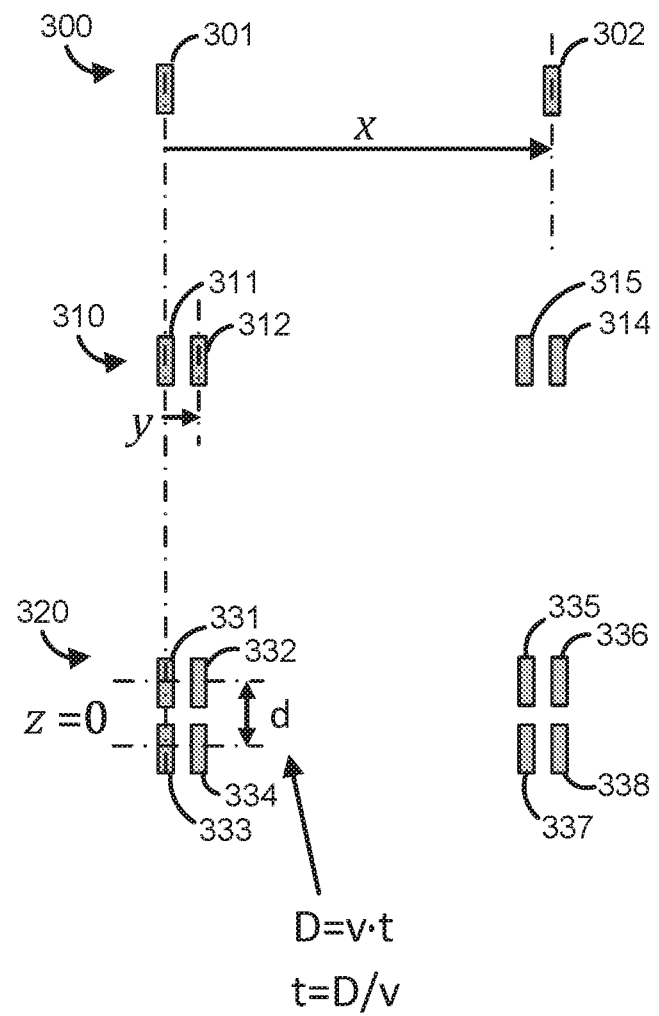
FIG. 4 illustrates a block diagram of aircraft wheel arrangement, in accordance with various embodiments.

With reference to FIG. 2A, a landing gear of aircraft 100 having a braking system 200 is shown schematically in a front view, looking forward to aft, in accordance with various embodiments. Braking system 200 may comprise right landing gear 108 and left landing gear 106. Braking system 200 illustrates an example of a set of landing gear having four wheels, however, it is further contemplated and understood that the system described herein may apply to various configurations of landing gear and wheels. For example, additional wheel configurations are shown in FIG. 4. Referring still to FIG. 2A, right landing gear 108 may be laterally displaced from left landing gear 106. Right landing gear 108 may comprise a plurality of wheels, such as a right outboard wheel 202 and a right inboard wheel 204. Right outboard wheel 202 may be laterally displaced from right inboard wheel 204. Right outboard wheel 202 may comprise a right outboard brake 206, and right inboard wheel 204 may comprise a right inboard brake 210. Right outboard brake 206 and right inboard brake 210 may be mounted in a conventional manner to right outboard wheel 202 and right inboard wheel 204, respectively, to apply and release braking force or braking pressure on each respective wheel.

Left landing gear 106 may comprise a plurality of wheels, such as a left outboard wheel 220 and a left inboard wheel 222. Left outboard wheel 220 may be laterally displaced from left inboard wheel 222. Further, left outboard wheel 220 and left inboard wheel 222 may be laterally displaced from right outboard wheel 202 and right inboard wheel 204. Left outboard wheel 220 may comprise a left outboard brake 224, and left inboard wheel 222 may comprise a left inboard brake 228. Left outboard brake 224 and left inboard brake 228 may be mounted in a conventional manner to left outboard wheel 220 and left inboard wheel 222, respectively, to apply and release braking force on each respective wheel.

Each landing gear 106, 108 may comprise a plurality of sensors. For example, each brake may include a sensor for detecting a braking pressure or a braking force applied to the respective wheel. Right landing gear 108 may include a right outboard (ROB) wheel sensor 208, a right inboard (RIB) wheel sensor 212, a ROB brake sensor 214 and RIB brake sensor 216. ROB brake sensor 214 may detect a pressure or a force applied to right outboard wheel 202 by right outboard brake 206. RIB brake sensor 216 may detect a pressure or a force applied to right inboard wheel 204 by right inboard brake 210. ROB wheel sensor 208 and RIB wheel sensor 212 may be coupled to each respective wheel to measure one or more characteristics of each wheel, such as wheel position, wheel speed, and/or wheel acceleration, measured in terms of linear or angular position, linear or angular velocity, linear or angular acceleration, or other measurement unit.

Left landing gear 106 may include a left outboard (LOB) wheel sensor 226, a left inboard (LIB) wheel sensor 230, a LOB brake sensor 232 and a LIB brake sensor 234. LOB brake sensor 232 may detect a pressure or a force applied to left outboard wheel 220 by right outboard brake 224. LIB brake sensor 234 may detect a pressure or a force applied to left inboard wheel 222 by left inboard brake 228. In various embodiments, brake sensors 214, 216, 232, 234 may detect a pressure applied to the respective wheel by a hydraulic or pneumatic actuator ram. In various embodiments, brake sensors 214, 216, 232, 234 may be force sensors, such as a load cell, which may detect a force applied to the respective wheel by an electromechanical actuator. LOB wheel sensor 226 and LIB wheel sensor 230 may be coupled to each respective wheel to measure one or more characteristics of each wheel, such as wheel position or displacement, wheel speed, and/or wheel acceleration, measured in terms of linear or angular position, linear or angular velocity, linear or angular acceleration, or other measurement unit. In various embodiments, wheel sensors 226, 230, 208, 212 may comprise wheel speed sensors that output signals indicative of angular velocity or angular displacement, for example, a Hall effect sensor, variable resistance sensor, or the like. Wheel sensors 226, 230, 208, or 212 may detect a change in a rate of deceleration of the wheels. In various embodiments, each of wheel sensors 226, 230, 208, 212 may comprise a plurality of sensors, for example a wheel speed sensor and an accelerometer or other sensor. The wheel speed data for each wheel may be sent to controller 110 and used to detect the onset of wheel skidding, to calculate or estimate a slip ratio for each wheel, and/or to calculate or estimate a coefficient of friction of a runway surface.

Figure 2B:
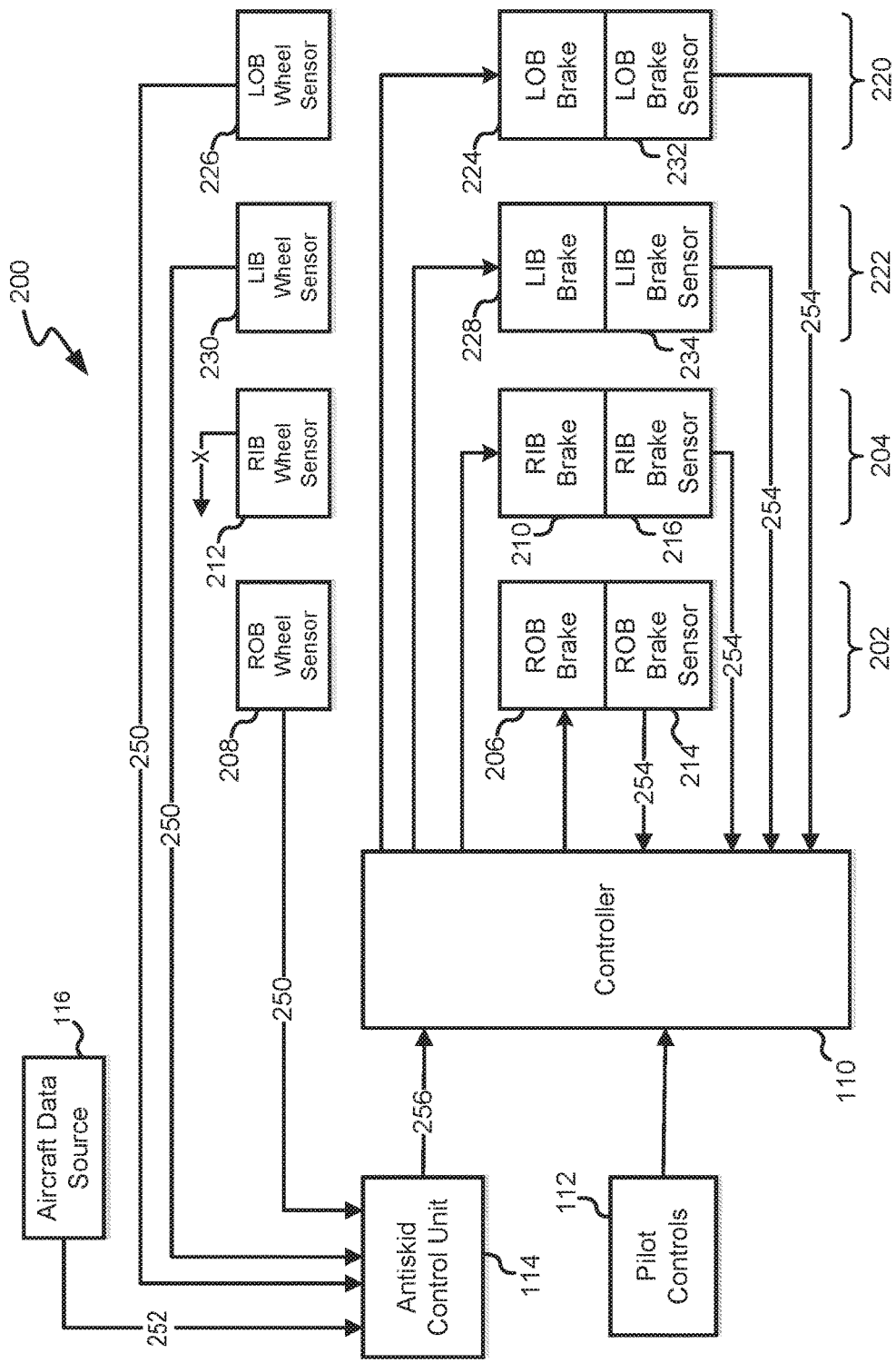
FIG. 2B illustrates a block diagram of a braking system for the aircraft, in accordance with various embodiments.

With reference to FIG. 2B, a schematic block diagram of braking system 200 is shown in accordance with various embodiments. Braking system 200 includes a controller 110 in communication with pilot controls 112 and an antiskid control unit 114. Controller 110 may comprise additional control modules (such as autobraking control, brake control executive, brake pressure control unit, etc.) for controlling brakes 206, 210, 228, 224. Controller 110 may receive input from pilot controls 112, antiskid control unit 114, and/or aircraft data source 116 and may determine an amount of braking pressure or braking force to be applied to the brake disk stack of each brake 206, 210, 228, 224. Controller 110 may receive input from wheel sensors 226, 230, 208, or 212 and from brake sensors 214, 216, 232, 234. Controller 110 may use data from the inputs to determine a reference wheel characteristic for one or more of the wheels of the braking system 200. A reference wheel characteristic may be a slip ratio of a wheel, a coefficient of friction experienced by a wheel, a braking pressure applied at the time of wheel skid, or other value correlating to the environment or performance associated with the wheel.

Controller 110 and/or antiskid control unit 114 may be in communication with wheel sensors 226, 230, 208, and 212.

During normal operation, wheel sensors 226, 230, 208, 212 may transmit the wheel speed data 250 (i.e., the angular velocity and/or acceleration of the wheel) of each wheel to controller 110 and/or antiskid control unit 114. Antiskid control unit 114 and controller 110 may further be in communication with an aircraft data source 116. Antiskid control unit 114 may receive aircraft data from aircraft data source 116, and for example, may receive the aircraft velocity 252. Antiskid control unit 114 may also receive wheel speed data from wheel sensors 226, 230, 208, 212. Antiskid control unit 114 may determine if a wheel is skidding based on the aircraft velocity 252, the wheel speed data 250, and/or other inputs from aircraft data source 116. A wheel skid may occur in response to the braking force or braking pressure applied to a wheel exceeding the traction available to that wheel. In response to a wheel experiencing wheel skid, antiskid control unit 114 and controller 110 may adjust the braking force or braking pressure of the corresponding brake.

Wheel sensors 226, 230, 208, or 212 may, from time to time, fail. Without wheel speed data 250, antiskid control unit 114 and controller 110 may encounter difficulty controlling the brake associated with the failed wheel sensor, shown in FIG. 2B as RIB wheel sensor 212. For example, antiskid functionality may be degraded, autobrake functionality may be degraded, and/or overall braking force may be degraded. In various embodiments, autobrake functionality refers to a braking control scheme where a desired deceleration is input to controller 110 and controller 110 adjusts braking pressure to achieve the desired deceleration. Due to the loss of wheel speed data 250, a controller may cease commanding braking pressure to the wheel associated with the failed sensor. Such ceasing of braking pressure, however, decreases the aircraft braking system's ability to slow the aircraft. This may be problematic on runways with contaminants such as ice, slush, snow, oil, and other materials that reduce the coefficient of friction of the runway surface.

In various embodiments, braking system 200 is configured to control the braking of the wheels 202, 204, 220, 222 of aircraft 100, including the wheel associated with the failed sensor. For illustration purposes, RIB wheel sensor 212 of right inboard wheel 204 is shown in FIG. 2B as a failed wheel sensor. Braking system 200 may use information about one or more reference wheels, such as wheels 202, 220, 222, to determine a braking pressure or braking force to apply to right inboard wheel 204 associated with the failed RIB wheel sensor 212. The term reference wheel or wheels may be used to indicate the wheels used to determine a braking pressure to be applied to a wheel having a failed wheel speed sensor. Antiskid control unit 114 may receive wheel speed data 250 from wheel sensors 226, 230, 208 and may determine when wheels 202, 222, 220 experience skidding. Antiskid control unit 114 may not receive wheel speed data 250 from the failed RIB wheel sensor 212, and thus, may not determine when right inboard wheel 204 experiences skidding. Braking system 200 may use the available wheel speed data 250 as well as braking feedback data 254 to control right inboard brake 210 while reducing the risk of skidding by right inboard wheel 204. Thus, controller 110 determines a reference wheel characteristic of one or more reference wheels to control, in substantially real-time, the braking of the wheel having a failed wheel speed sensor. The reference wheel characteristic may include a braking pressure applied to the reference wheel at the time of wheel skid.

Controller 110 may receive wheel skid information 256 from antiskid control unit 114 as well as braking feedback data 254 from brake sensors 214, 216, 232, 234. Wheel skid information 256 may include the time at which a wheel skid event occurred. Wheel skid information 256 may include wheel speed data 250 and/or data from aircraft data source 116. Braking feedback data 254 may include the pressure or force applied to a brake 206, 210, 228, 224. Controller 110 may determine the braking pressure or braking force at which a wheel experiencing skidding based on the braking feedback data 254 and the wheel skid information 256. Controller 110 may gather data for the skid events of wheels 202, 222, 220 into a sample.

Figure 3A:
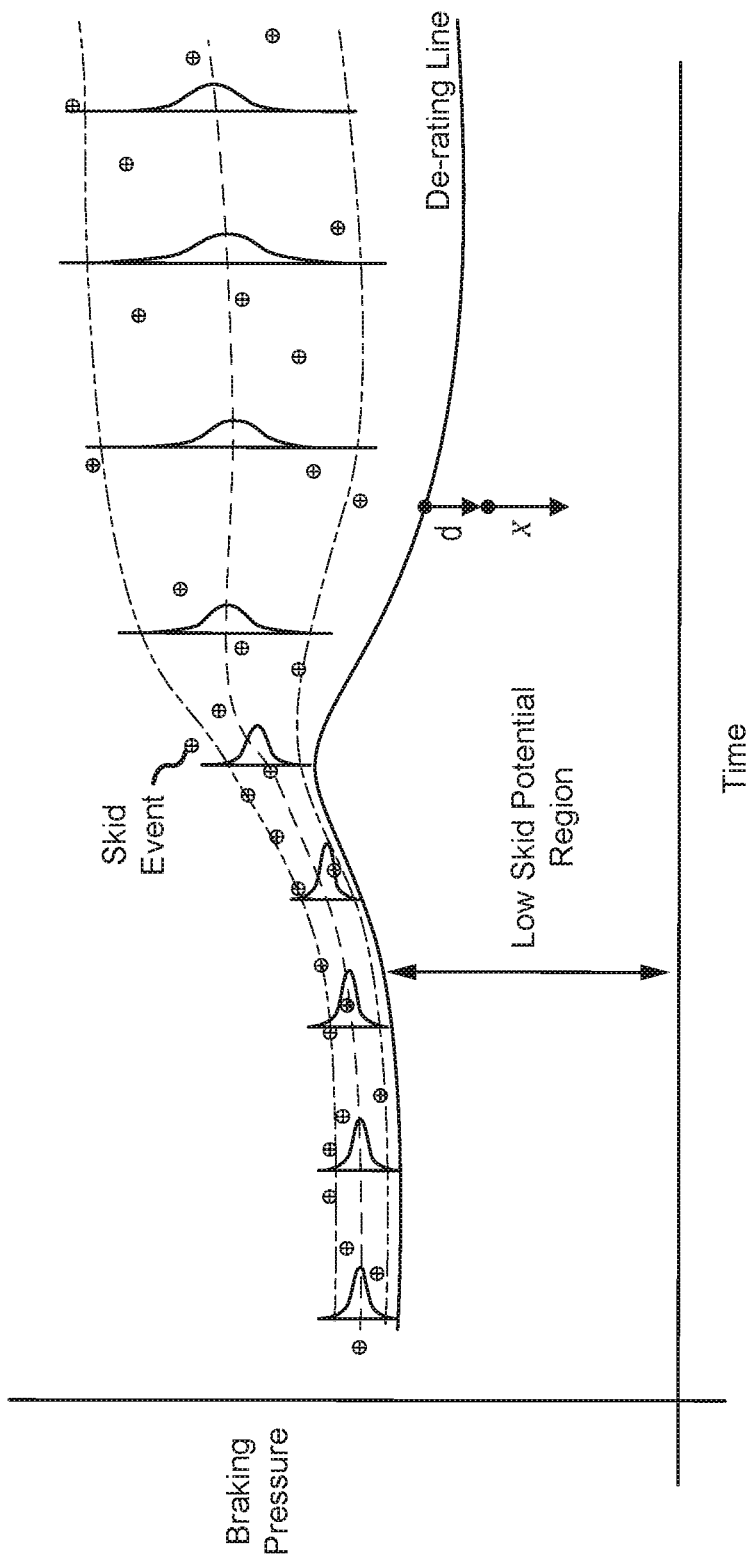
FIG. 3A illustrates a brake pressure de-rating algorithm according to consistency of braking pressure at wheel skid, in accordance with various embodiments.

With reference to FIG. 3A, a graph is shown having consistency values (i.e., consistency of a sample of braking pressure of wheels 202, 222, 220) on the y axis and the time of each wheel skid event on the x axis. Controller 110 may gather the braking pressure at the time of wheel skidding for wheels 202, 222, 220 and may determine a consistency value based upon the braking pressures in the sample. A consistency value may be any measure to show how different the braking pressures are from one another during the wheel skid events. Stated another way, the consistency value indicates the shape of the distribution of braking pressures during skid events. In various embodiments, the consistency value comprises the standard deviation of the braking pressures in the sample. Higher standard deviations reflect less consistency than smaller standard deviations. The more consistent the braking pressures are among the skid events sampled, the greater confidence there is to command a braking pressure to right inboard wheel 204 that is similar to the braking pressure applied to the reference wheel(s) without causing right inboard wheel 204 to skid. Inconsistent braking pressures may indicate a runway surface of varying coefficients of friction, and thus the less confidence there is to command a similar braking pressure to right inboard wheel 204 having the failed wheel sensor, as skidding becomes a concern.

Figure 3B:
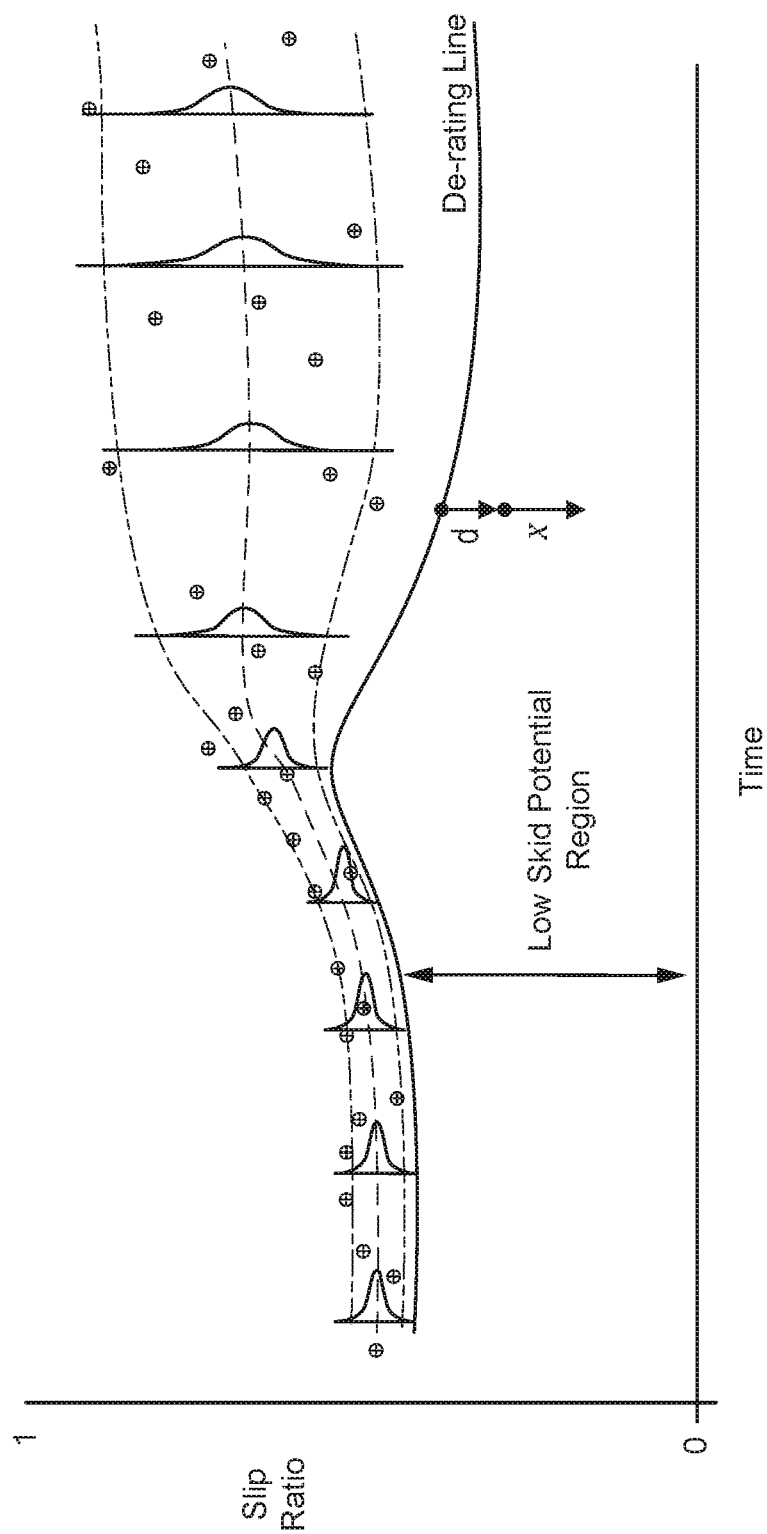
FIG. 3B illustrates a brake pressure de-rating algorithm according to consistency of wheel skid ratios, in accordance with various embodiments.

With reference to FIG. 3B, a graph is shown having consistency values (i.e., consistency of a sample of slips ratios for wheels 202, 222, 220) on the y axis and the time of each sample on the x axis. The reference wheel characteristic may include a slip ratio of the reference wheel(s). Slip ratio as used herein may refer to an expression of the locking status of a wheel, which may be calculated as the difference between the aircraft speed and the wheel speed, divided by the aircraft speed. Controller 110 may receive aircraft data from aircraft data source 116 and/or antiskid control unit 114, and for example, may receive the aircraft velocity 252. Controller 110 may also receive wheel speed data from wheel sensors 226, 230, 208. Controller 110 may determine a slip ratio for one or more reference wheels, such as wheels 202, 222, 220. Controller 110 may determine a consistency value based upon the slip ratios in the sample. A consistency value may be any measure to show how different the slip ratios are from one another, and for example, may be the standard deviation of the slip ratios in the sample. Higher standard deviations reflect less consistency than smaller standard deviations. The more consistent the braking pressures are among the skid events sampled, the greater confidence there is to command a braking pressure to right inboard wheel 204 that is similar to the braking pressure applied to the reference wheel(s) without causing right inboard wheel 204 to skid. Inconsistent braking pressures may indicate a runway surface of varying coefficients of friction, and thus the less confidence there is to command a similar braking pressure to right inboard wheel 204 having the failed wheel sensor, as skidding becomes a concern.

Referring to FIGS. 3A and 3B, controller 110 may determine a preliminary amount of braking pressure to be applied to right inboard wheel 204, based on the consistency value of the reference wheel characteristic, such as a braking pressure at skid or a slip ratio. Controller 110 may command a braking pressure to right inboard brake 210 based at least in part on the consistency value. The de-rating line illustrates preliminary amount of braking pressure to be commanded to right inboard brake 210. The preliminary amount of braking pressure may be further adjusted as discussed with respect to FIGS. 4 and 5. For a higher consistency value, the preliminary amount of braking pressure is similar to the braking pressure of the reference wheels. For a lower consistency value, the preliminary amount of braking pressure is reduced relative to the braking pressure of the reference wheels. Thus, the difference between the preliminary amount of braking pressure and the braking pressure of the reference wheels is greater at low consistency values than at higher consistency values. In this manner, the antiskid functionality, which controller 110 performs for wheels having functioning wheel speed sensors, acts as a guide to determine how much to "de-rate" or reduce the braking pressure applied to the wheel having a failed wheel speed sensor.

Figure 5:
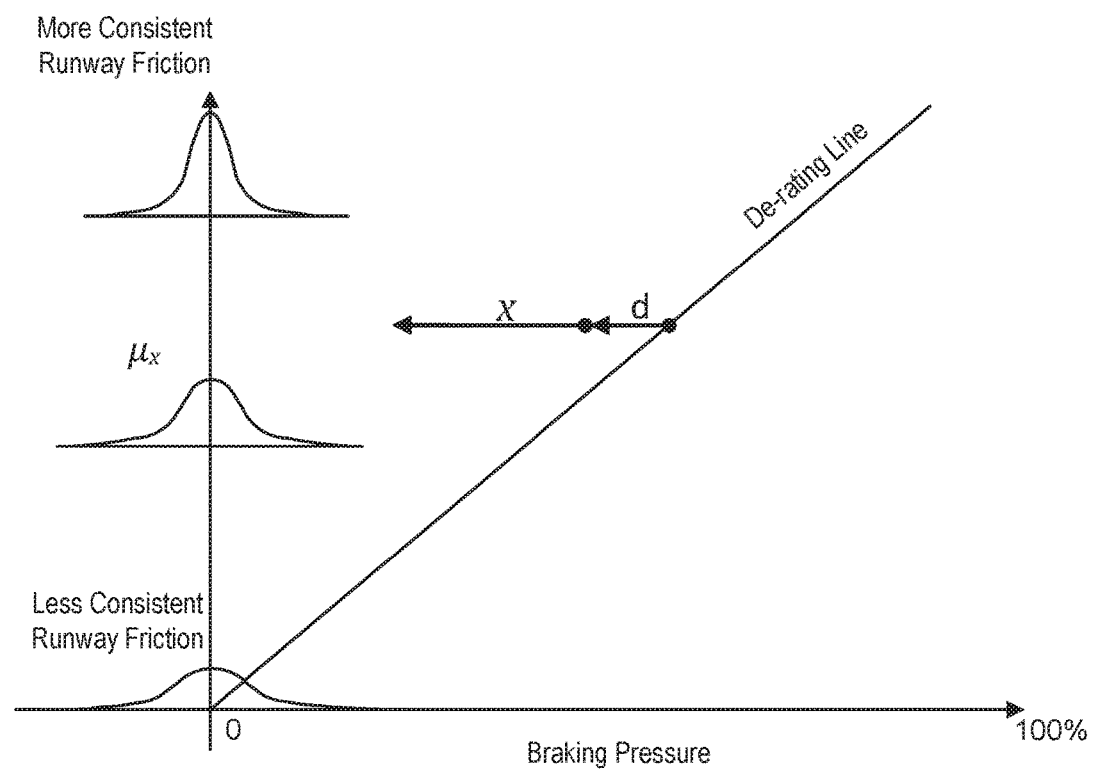
FIG. 5 illustrates a relationship between consistency of coefficient of friction of a runway versus percentage of brake pressure application, in accordance with various embodiments.

In various embodiments and with reference to FIG. 5, the reference wheel characteristic may include a coefficient of friction experienced by the reference wheel(s). The coefficient of friction experienced by another wheel (e.g. a reference wheel or wheels) on the aircraft may be calculated or estimated over time to determine the consistency (i.e., produce a consistency value) of the coefficients of friction. The more consistent the coefficients of friction are among the coefficients of friction sampled, the greater confidence there is to command a braking pressure to the wheel having the failed wheel sensor that is similar to the braking pressure applied to the reference wheel(s). Inconsistent coefficients of friction indicate a runway surface of varying coefficients of friction, and thus the less confidence there is to command a similar braking pressure to the wheel having the failed wheel sensor, as skidding becomes a concern.

Moreover, the displacement of the reference wheel from the wheel having a failed wheel sensor affects the consistency value. For example, if the reference wheel is laterally displaced from the wheel having a failed wheel sensor by a small distance, it is likely that the reference wheel behaves similarly to the wheel having a failed wheel sensor. However, that likelihood decreases as the lateral distance increases. In addition, displacement in a forward/aft direction may indicate that the reference wheel and the wheel having a failed wheel sensor may encounter similar coefficients of friction, or may skid at a similar braking pressure, though offset for the lead or lag time of the reference wheel against the wheel having a failed wheel sensor.

Figure 7:
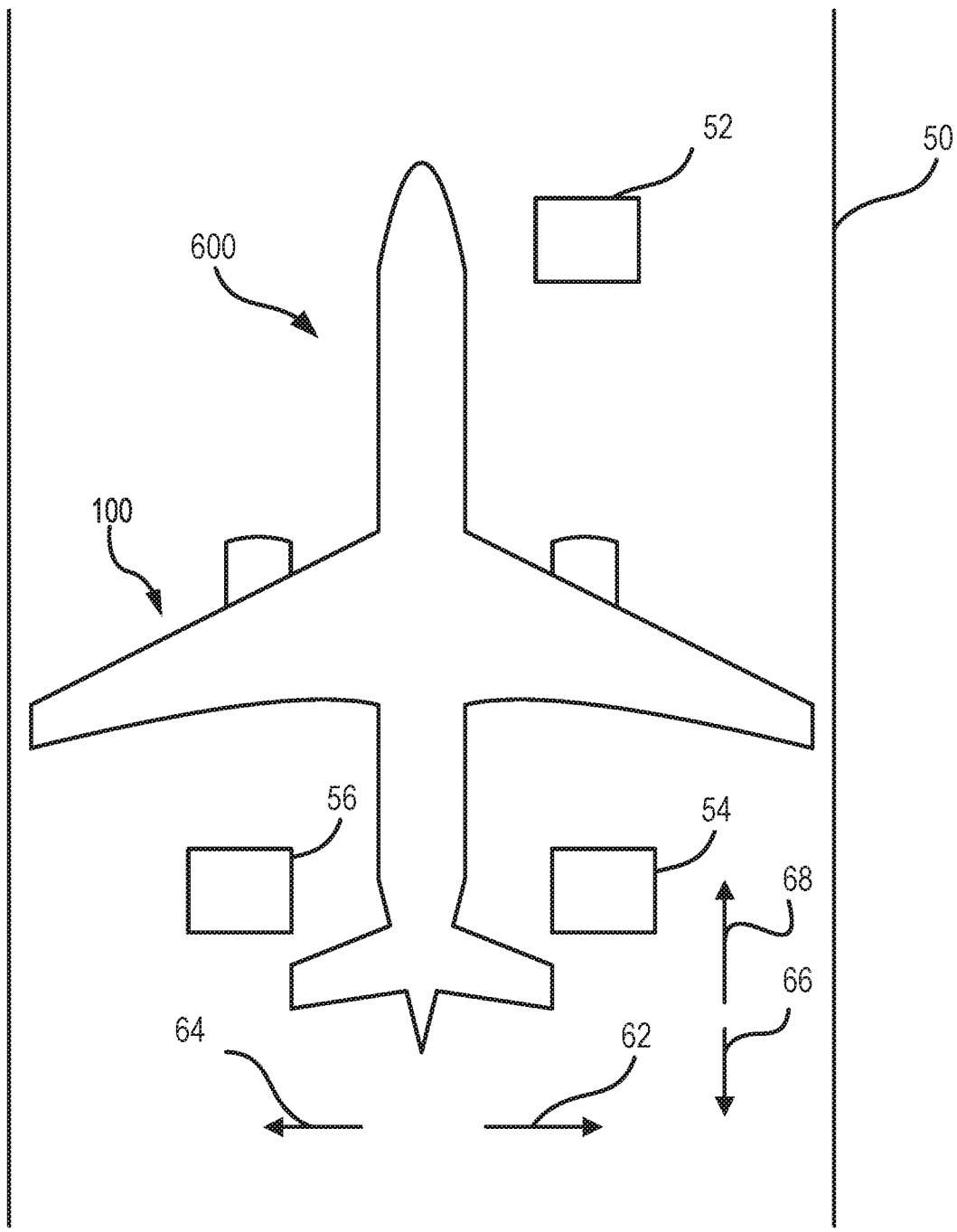
FIG. 7 illustrates an aircraft on a runway, in accordance with various embodiments.

With reference to FIG. 7, aircraft 100 is illustrated on runway 50 during landing. Patch 56 represents ice. Patch 54 represents a mixture of ice and snow. Patch 52 represents spilled lubricant, such as oil. Forward direction 68 is shown 180 degrees opposite aft direction 66. Starboard direction 62 is shown 180 degrees opposite port direction 64, though displacement in the starboard direction 62 and/or port direction 64 may be referred to herein as lateral displacement. The remainder of runway 50 may be relatively dry. As aircraft 100 progresses across runway 50, one or more wheels of aircraft 100 encounters dry runway 50 along with patches 52, 54 and 56. In that regard, each wheel of aircraft 100 may experience different coefficients of friction (i.e., coefficients of kinetic friction) depending upon the surface encountered.

In various embodiments, controller 110 may calculate a slip ratio and/or a coefficient of friction experienced by a given reference wheel (e.g., right outboard wheel 202, left outboard wheel 220, and left inboard wheel 222) at regular intervals. For example, controller 110 may calculate a slip ratio and/or a coefficient of friction for each reference wheel of aircraft 100 at intervals of from 0.1 Hertz (Hz) to 100 Hz, from 1 Hz to 50 Hz, and from 6 Hz to 15 Hz. Each slip ratio and/or coefficient of friction calculated for each reference wheel may be stored by controller 110 and accessed at a desired time. In various embodiments, the brake pressure applied to the wheel having a failed wheel speed sensor may be adjusted in substantially real time based on the reference wheel characteristic determined by controller 110.

Controller 110 may gather the coefficients of friction into a sample and determine a consistency value based upon the coefficients of friction in the sample. A consistency value may be any measure to show how different the coefficients of friction are from one another. Stated another way, the consistency value indicates the shape of the distribution of coefficients of friction. In various embodiments, the consistency value comprises the standard deviation of the coefficients of friction in the sample. Higher standard deviations reflect less consistency than smaller standard deviations. Controller 110 may command braking pressure to one or more wheels of aircraft 100. Controller 110 may command braking pressure from 0% of the brake's potential pressure to 100% of the brake's potential pressure.

With reference to FIG. 4, different aircraft are shown having different numbers of wheels. Aircraft 300 is shown having wheel 301 laterally displaced from wheel 302 by a distance of x. Aircraft 310 is shown having wheel 311 and wheel 312 laterally displaced from wheel 314 and wheel 315. Wheel 311 is laterally displaced from wheel 312 by a distance of y. Aircraft 320 is shown having wheel 331 and wheel 332 laterally displaced from wheel 335 and wheel 336. Aircraft 320 also comprises wheel 333 and wheel 334 laterally displaced from wheel 337 and wheel 338. Wheel 331 is displaced in a forward/aft direction from wheel 333 by a distance of d and wheel 331 is laterally displaced from wheel 333 by a distance z, where z=0. It is noted that distance traveled by wheel 331, represented by D, may be derived if the linear velocity and time period is known for wheel 331, according to the equation D=vt. Travel distance D and/or forward/aft displacement distance d may be used to determine when wheel 333 will encounter the runway surface encountered by wheel 331. As discussed herein, the term reference wheel or wheels may be used to indicate the wheels used to determine the braking pressure to be applied to a wheel having a failed wheel speed sensor. In this manner, the antiskid functionality, which controller 110 performs for wheels having functioning wheel speed sensors, acts as a guide to determine how much to "de-rate" or reduce the braking pressure applied to the wheel having a failed wheel speed sensor. The braking pressure may be adjusted based on travel distance D and/or forward/aft displacement distance d between the wheels. For example, controller 110 may de-rate the braking pressure more where forward/aft displacement d is greater. By de-rating the braking pressure to the wheel having the failed wheel speed sensor, the wheel having the failed wheel speed sensor is less likely to skid.

With reference to FIG. 5, a graph is shown having consistency values (i.e., consistency of a sample of coefficients of friction $\mu_x$ of wheels) on the y axis and percentage of a brake's potential pressure as applied to the reference wheel(s) on the x axis. As $\mu_x$ becomes less consistent, the de-rating line illustrates the correction factor to be applied to the braking pressure of the reference wheel to yield a braking pressure to be applied to the wheel having a failed wheel speed sensor. Stated another way, the de-rating line may indicate that at 50% of maximum braking pressure for the reference wheel and moderate consistency values of coefficients of friction, 50% of the braking pressure applied to the reference wheel is to be applied to the wheel having a failed wheel speed sensor. The de-rating line thus creates a preliminary amount of braking pressure to be commanded.

However, as discussed above, because the lateral and/or forward/aft distance between the reference wheel and the wheel having a failed wheel speed sensor influences the confidence level of determining the conditions of the wheel having a failed wheel speed sensor, the de-rating may be adjusted, or offset, by such values. For example, with reference to FIGS. 4 and 5, wheel 331 may experience a failed wheel speed sensor and wheel 338 may act as a reference wheel. A controller may calculate coefficients of friction of wheel 338 and determine a consistency value of such samples.

Controller 110 may further account for both a lateral displacement distance x and a forward/aft displacement distance d between wheel 338 and wheel 331. To account for forward/aft displacement distance d, the braking pressure to be applied to wheel 331 may be reduced from the preliminary amount based on the consistency value, as shown in FIG. 5. Thus, if the de-rating line indicates that wheel 331 should receive 50% of the braking pressure applied to wheel 338, adjusting to account for the distance d may yield, for example, that wheel 331 should receive 45% of the braking pressure applied to wheel 338. To account for lateral displacement distance x, the braking pressure to be applied to wheel 331 may be further reduced, as shown in FIG. 5. Adjusting to account for the distance x may yield, for example, that wheel 331 should receive 35% of the braking pressure applied to wheel 338. With momentary reference to FIGS. 2A, 2B, 3A and 3B, the preliminary amount of braking pressure to be applied by right inboard brake 210 (shown by de-rating line in FIGS. 3A and 3B) may be similarly adjusted to account for the lateral distance and/or forward/aft distance between right inboard wheel 204 and the reference wheel(s).

In various embodiments, the forward/aft displacement distance d or a lateral displacement distance x may be zero. For example, with reference to FIGS. 4 and 5, wheel 301 may experience a failed wheel speed sensor and wheel 302 may act as a reference wheel. A forward/aft displacement distance d between wheel 301 and wheel 302 may be zero. A controller may calculate coefficients of friction of wheel 302 and determine a consistency value of such samples. To account for lateral displacement distance x, the braking pressure to be applied to wheel 301 may be reduced. Thus, if the de-rating line indicates that wheel 301 should receive 50% of the braking pressure applied to wheel 302, adjusting to account for the distance x may yield, for example, that wheel 301 should receive 40% of the braking pressure applied to wheel 302.

In various embodiments, wheel 331 may experience a failed wheel speed sensor and wheel 333 may act as a reference wheel. A lateral displacement distance z between wheel 301 and wheel 302 may be zero. A controller may calculate coefficients of friction of wheel 333 and determine a consistency value of such samples. To account for forward/ aft displacement distance d, the braking pressure to be applied to wheel 331 may be reduced. Thus, if the de-rating line indicates that wheel 331 should receive 50% of the braking pressure applied to wheel 333, adjusting to account for the distance d may yield, for example, that wheel 331 should receive 45% of the braking pressure applied to wheel 333.

Where multiple wheels are used as reference wheels, a weighting factor may be used to weight the coefficients of friction depending upon the lateral displacement and/or forward/aft displacement of each reference wheel and the wheel experiencing the failed wheel speed sensor. The weighting factor may weight the values produced by a reference wheel closest to the wheel experiencing the failed wheel speed sensor more heavily than reference wheels that are a greater distance from the wheel experiencing the failed wheel speed sensor. Use of a weighting factor allows controller 110 to better estimate the coefficient of friction actually experienced by the wheel experiencing the failed wheel speed sensor.

Figure 6A:
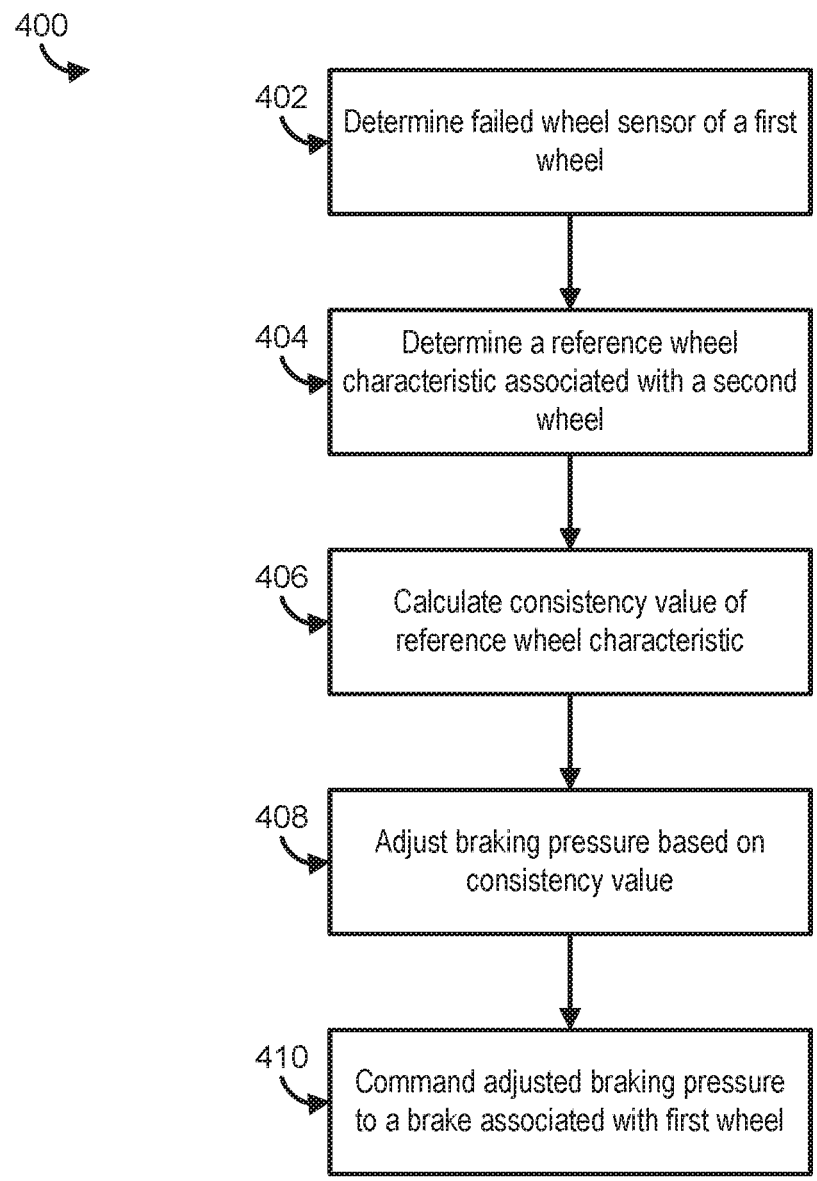
FIGS. 6A, 6B and 6C illustrate methods of antiskid operation, in accordance with various embodiments.

With reference to FIG. 6A, a method 400 of an antiskid operation is illustrated, in accordance with various embodiments. Controller 110 may determine that a wheel speed sensor has failed in Step 402. In Step 404, controller 110 may determine a reference wheel characteristic associated with a second wheel. Controller 110 may receive inputs from pilot controls 112, antiskid control unit 114, aircraft data source 116, one or more brake sensors, and/or one or more wheels sensors associated with the second wheel, which acts as a reference wheel. Controller 110 may use data from the inputs to determine a reference wheel characteristic for one or more of reference wheels of the braking system 200. For example, a reference wheel characteristic may be a slip ratio of the second wheel, a coefficient of friction experienced by the second wheel, a braking pressure applied to the second wheel at the time of wheel skid, or other value correlating to the environment or performance associated with the second wheel. Where more than one reference wheel is used, one or more weighting factors may be used to weight the reference wheel characteristic.

In Step 406, a consistency value may be calculated by controller 110. The consistency value may be the consistency of the reference wheel characteristic for the second wheel, or for one or more reference wheels. The consistency value, as discussed above, may comprise a standard deviation value. From the consistency value, the controller 110 may use a map, lookup table, or other data structure to determine a preliminary amount to de-rate the braking pressure commanded at the wheel having the wheel speed sensor failure.

In Step 408, controller 110 may adjust a braking pressure applied to the first wheel based upon the consistency value.

In Step 410, controller 110 may command a brake associated with the wheel having the failed wheel speed sensor. The controller 110 may command the adjusted braking pressure to the brake associated with the wheel having the failed wheel speed sensor. Thus, the adjusted braking pressure applied to the first wheel may be based on a reference wheel characteristic of the second wheel, and more specifically, based on a consistency value of the reference wheel characteristic of the second wheel.

Figure 6B:
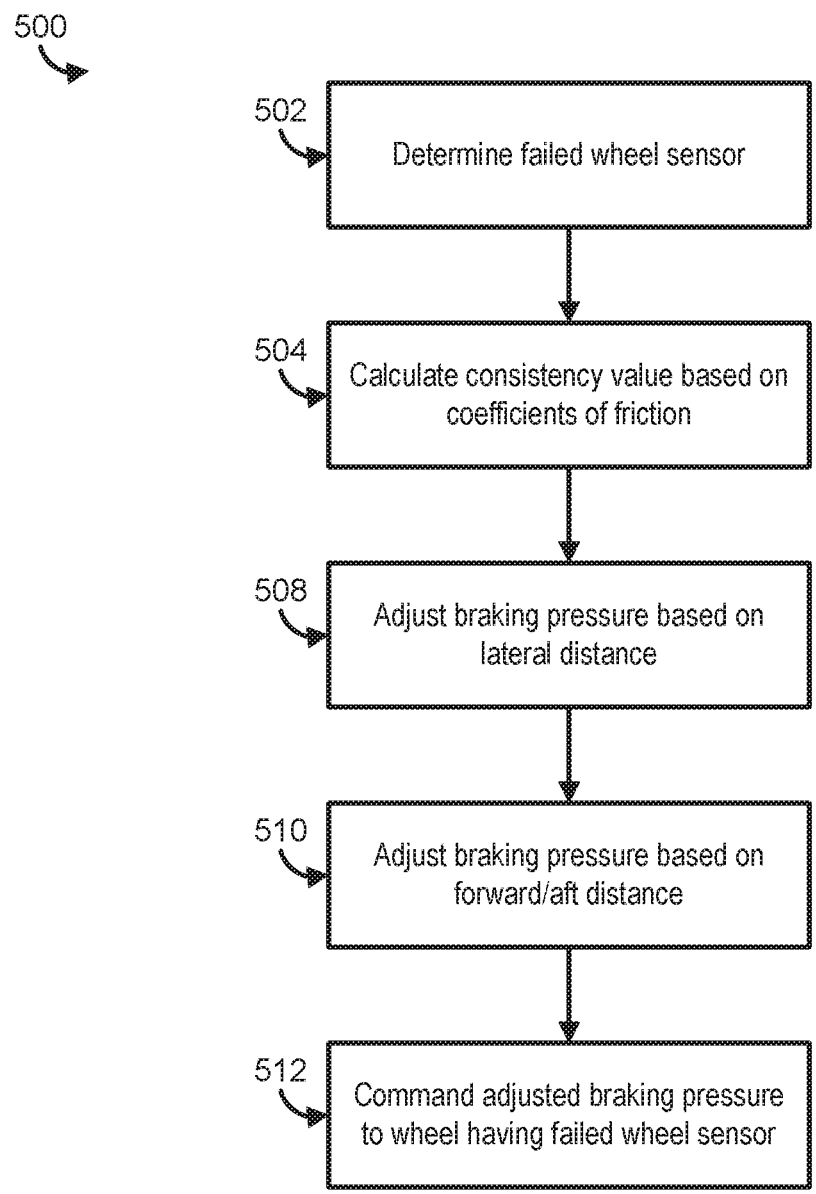

With reference to FIG. 6B, along with FIGS. 4 and 5, a method 500 of an antiskid operation is illustrated. Controller 110 may determine that a wheel speed sensor has failed in Step 502. Controller 110 may receiving at least two coefficients of friction associated with a second wheel in response to failure of a first wheel speed sensor coupled to a first wheel. The first wheel may be laterally displaced from the second wheel by a lateral distance and/or forward/aft distance.

In Step 504, controller 110 may calculate coefficients of friction from one or more reference wheels, such as the second wheel, to form a sample set of coefficients of friction. Where more than one reference wheel is used, one or more weighting factors may be used to weight the coefficients of friction. Also in Step 504, a consistency value may be calculated by controller 110. The consistency value may be the consistency of the coefficients of friction associated with one or more reference wheels. The consistency value, as discussed above, may comprise a standard deviation value. From the consistency value, the controller 110 may use a map, lookup table, or other data structure to determine a preliminary amount to de-rate the braking pressure commanded at the wheel having the wheel speed sensor failure. Controller 110 may adjust a braking pressure applied to the first wheel based upon the consistency value, and may adjust the braking pressure as a proportion of a braking pressure applied to the second wheel.

In Step 508, controller 110 adjusts the preliminary amount to account for lateral distance. In that regard, the larger the lateral distance, the more reduction in braking pressure will be commanded.

In Step 510, controller 110 adjusts the preliminary amount to account for forward/aft distance. In that regard, the larger the forward/aft distance, the more reduction in braking pressure will be commanded.

In Step 512, controller commands a brake associated with the wheel having the failed wheel speed sensor. The controller 110 may command the adjusted braking pressure to the brake associated with the wheel having the failed wheel speed sensor.

Figure 6C:
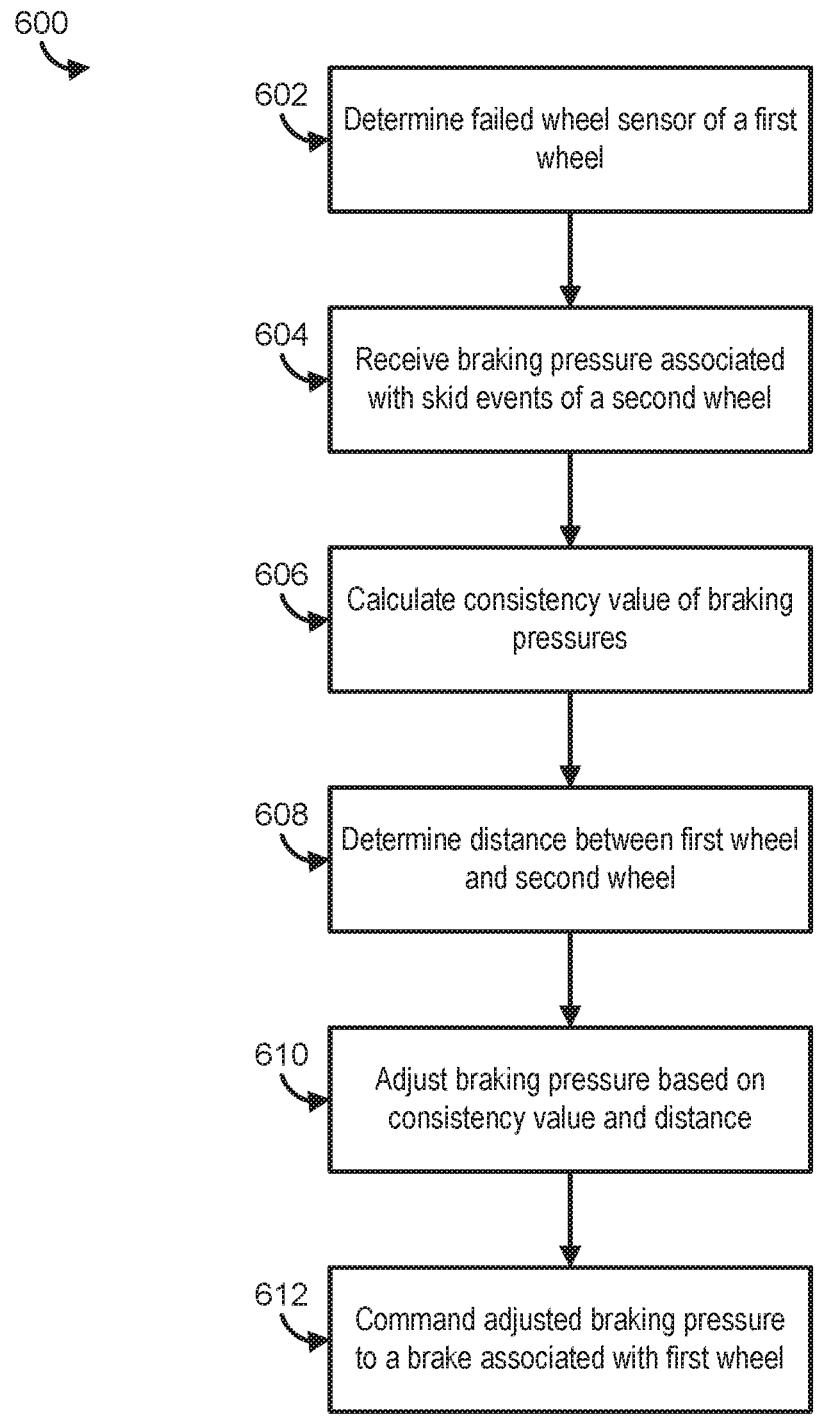

With reference to FIG. 6C, along with FIGS. 2B and 3A, a method 600 of an antiskid operation is illustrated. Controller 110 may determine that a wheel speed sensor has failed in Step 602. In Step 604, controller 110 may receiving a braking pressure for at least two wheel skid events for a second wheel in response to failure of a first wheel speed sensor coupled to a first wheel. The first wheel may be laterally displaced from the second wheel by a lateral distance and/or forward/aft distance.

In Step 604, controller 110 may determine a braking pressure associated with the wheel skid events from one or more brake sensors, such as a brake sensor of the second wheel, to form a sample set of braking pressures. Where more than one reference wheel is used, one or more weighting factors may be used to weight the braking pressures.

In Step 606, a consistency value may be calculated by controller 110. The consistency value may be the consistency of the braking pressures associated with one or more reference wheels. The consistency value, as discussed above, may comprise a standard deviation value. From the consistency value, the controller 110 may use a map, lookup table, or other data structure to determine a preliminary amount to de-rate the braking pressure commanded at the wheel having the wheel speed sensor failure.

In Step 608, controller 110 may determine a lateral distance and/or a forward/aft distance between the reference wheel(s) and the wheel having the failed wheel speed sensor.

In Step 610, controller 110 may adjust a braking pressure applied to the first wheel based upon the consistency value, and may adjust the braking pressure as a proportion of a braking pressure applied to the second wheel. In step 610, controller 110 may adjust the preliminary amount to account for lateral distance. In that regard, the larger the lateral distance, the more reduction in braking pressure will be commanded. In Step 610, controller 110 may adjust the preliminary amount to account for forward/aft distance. In that regard, the larger the forward/aft distance, the more reduction in braking pressure will be commanded.

In Step 612, controller commands a brake associated with the wheel having the failed wheel speed sensor. The controller 110 may command the adjusted braking pressure to the brake associated with the wheel having the failed wheel speed sensor.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A braking system comprising:
   a controller;
   a first wheel and a second wheel, the first wheel laterally displaced from the second wheel by a first distance; and
   a third wheel, the third wheel laterally displaced from the second wheel;

a first wheel speed sensor coupled to the first wheel, a second wheel sensor coupled to the second wheel, and a third wheel sensor coupled to the third wheel;

wherein the controller is configured to determine a braking data comprising at least one of a slip ratio, a coefficient of friction, or a braking pressure of the second wheel and the third wheel in response to failure of the first wheel speed sensor;

wherein the controller is configured to calculate a consistency value of the at least one of the slip ratio, the coefficient of friction, or the braking pressure, wherein the consistency value comprises a standard deviation of a sample of the braking data for the second wheel and the braking data for the third wheel;

wherein the consistency value is determined using a weighting factor with the at least one of the slip ratio, the coefficient of friction, or the braking pressure associated with the third wheel; and wherein the controller is configured to adjust a braking pressure applied to the first wheel based upon the consistency value and the first distance.

2. The braking system of claim 1, wherein the controller is configured to adjust the braking pressure applied to the first wheel as a proportion of the braking pressure applied to the second wheel.

3. The braking system of claim 1, wherein the first wheel is separated from the second wheel by a second distance, the second distance representing that the first wheel is at least one of forward or aft of the second wheel.

4. The braking system of claim 1, wherein the first wheel is disposed on a different landing gear than the second wheel.

5. A method comprising:

determining, by a controller, a braking data comprising at least one of a slip ratio, a coefficient of friction, or a braking pressure of a second wheel and a third wheel in response to failure of a first wheel speed sensor coupled to a first wheel, the first wheel being laterally displaced from the second wheel by a first distance, and the third wheel being laterally displaced from the second wheel;

calculating, by the controller, a consistency value of the at least one of the slip ratio, the coefficient of friction, or the braking pressure associated with the second wheel, wherein the consistency value comprises a standard deviation of a sample of the braking data for the second wheel and the braking data for the third wheel; weighting, by the controller, the at least one of the slip ratio, the coefficient of friction, or the braking pressure associated with the third wheel in the calculating the consistency value; and adjusting, by the controller, a braking pressure applied to the first wheel based upon the consistency value and the first distance.

6. The method of claim 5, wherein the adjusting comprises adjusting the braking pressure applied to the first wheel as a proportion of the braking pressure applied to the second wheel.

7. The method of claim 5, further comprising adjusting, by the controller, the braking pressure applied to the first wheel based upon a second distance, the second distance separating the second wheel from the first wheel in at least one of the forward or aft direction.

8. The method of claim 5, further comprising mapping, by the controller, the consistency value to a preliminary amount of braking pressure.

9. The method of claim 5, wherein the calculating the consistency value comprises calculating a standard deviation to produce the consistency value.

* * * * *